United States Patent
Li et al.

(10) Patent No.: US 10,257,308 B2
(45) Date of Patent: Apr. 9, 2019

(54) RECOMMENDING A GROUP TO A USER OF A SOCIAL NETWORKING SYSTEM BASED ON AFFINITIES OF THE USER FOR MEMBERS OF THE GROUP

(71) Applicant: Facebook, Inc., Menlo Park, CA (US)

(72) Inventors: Jingxian Li, Redmond, WA (US); Li Ju, Issaquah, WA (US); Eric Carl Ertmann, San Francisco, CA (US); Felix Wong, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 361 days.

(21) Appl. No.: 15/162,577

(22) Filed: May 23, 2016

(65) Prior Publication Data
US 2017/0337250 A1    Nov. 23, 2017

(51) Int. Cl.
*G06F 17/30* (2006.01)
*H04L 29/08* (2006.01)
*G06Q 50/00* (2012.01)

(52) U.S. Cl.
CPC ......... *H04L 67/306* (2013.01); *G06Q 50/01* (2013.01); *H04L 67/22* (2013.01)

(58) Field of Classification Search
CPC .......................... H04L 67/306; G06Q 50/01
See application file for complete search history.

(56) References Cited

U.S. PATENT DOCUMENTS

| | | | |
|---|---|---|---|
| 8,688,782 B1* | 4/2014 | Lin | G06Q 30/02 709/203 |
| 2014/0067967 A1* | 3/2014 | Jackson | G06Q 50/01 709/206 |

* cited by examiner

*Primary Examiner* — Loc Tran
(74) *Attorney, Agent, or Firm* — Fenwick & West LLP

(57) ABSTRACT

A social networking system identifies a set of groups of which a user of the social networking system is not a member and selects a group for recommendation to the user based on a predicted affinity of the user for each identified group. The social networking system computes an affinity score of the user for each of one or more members of the selected group based at least in part on information describing a set of connections between the user and each member. Based on the scores, the social networking system selects a set of members of the group and generates a recommendation unit, wherein images associated with the selected members are arranged based on their scores and overlay at least a portion of an image associated with the group. The recommendation unit is communicated to the user to suggest that the user join the recommended group.

25 Claims, 4 Drawing Sheets

RECOMMENDING A GROUP TO A USER OF A SOCIAL NETWORKING SYSTEM BASED ON AFFINITIES OF THE USER FOR MEMBERS OF THE GROUP

BACKGROUND

This disclosure relates generally to social networking systems, and more specifically to recommending a group to a user of a social networking system.

A social networking system allows its users to connect to and communicate with other social networking system users. Users may create profiles on a social networking system that are tied to their identities and include information about the users, such as interests and demographic information. The users may be individuals or entities such as corporations or charities. Because of the popularity of social networking systems and the significant amount of user-specific information maintained by social networking systems, a social networking system provides an ideal forum for allowing users to create and join various groups of users sharing common interests (e.g., recreational hobbies, occupational backgrounds, political viewpoints, etc.) maintained by the social networking system.

Groups that are maintained by a social networking system are associated with subject matter that is common to social networking system users that are members of the same group. For example, subject matter associated with groups include interests, associations, affiliations, and/or any other characteristics common to a group of users. For example, members of a group may share a common workplace, a favorite celebrity, or a religious view. Groups enable social networking system users to easily connect to and communicate with additional social networking system users belonging to the same group, for example, by posting content to the group, by participating in group discussions, etc.

A social networking system may select one or more groups of which a user of the social networking system is not a member but which the user is likely to have an interest in joining, and recommend that the viewing user join the group(s). For example, if a user is associated with a user profile that indicates the user is located in Hollywood, Calif. and that the user's interests include singing and acting, the social networking system may recommend that the user join a theater group and an acapella group associated with geographic locations near Hollywood, Calif. A recommendation to join a group may include various types of information that may help a user to decide whether to join the group as well as an option to request to join the group. For example, a recommendation to join a group may include the name of the group, a geographic location associated with the group, an image associated with the group (e.g., a group logo), a purpose or mission statement of the group, a number of members in the group, and a "join" button enabling the user to submit a request to the social networking system to join the group.

Social networking system users are more likely to join a group if they know someone who is already a member of the group. However, users may not always be aware of whether their friends, family members, or other users to which they are connected on the social networking system are members of a group. For example, although a user whose hobbies include playing video games may be interested in joining a group for video game enthusiasts that is suggested by the social networking system, the user may decide against requesting to join the group if they are not aware that their friends recently became members of the group. Additionally, social networking system users that are interested in joining groups to make new friends may not join groups suggested by the social networking system if the users do not seem likely to have much in common with members of the groups. For example, a young social networking system user interested in learning how to knit may refrain from requesting to join a knitting group with members of all ages if the user assumes that the members of the group will be much older than they are. Absent information identifying current members of a group to which a user is connected and/or to which a user is likely to have an affinity in a recommendation to join the group, the user may decide against joining the group or otherwise reduce their interaction with the social networking system.

SUMMARY

A social networking system enables users of the social networking system to create and join various groups maintained by the social networking system, where each group is associated with one or more interests shared by users that are members of the same group. For example, members of a group may be friends, family members, teammates, coworkers, or other users that share a common interest or hobby. Groups allow social networking system users to easily connect to and share content with additional users that are members of the same group. For example, members of a group may post content to the group, participate in group discussions or chats, upload photos to albums shared by the group, and collaborate on documents shared by the group. The social networking system maintains information associated with each group, such as a group name, a group description, a group image, a geographic location, and group members. For example, information maintained by the social networking system in conjunction with the group "Bay Area Pomeranians" may include a description of the group members as Pomeranian dog breed owners and admirers, a cover photo for the group, a Northern California Bay Area location, a list of group events, a list of group members, a shared group photo album, etc.

The social networking system identifies a group in which a particular user ("viewing user") of the social networking system is not a member and in which the user is likely to have an interest, and presents the user with a recommendation that the user join the group. The social networking system may identify a group to recommend to a viewing user based on similarities between the user's interests and a description of the group, based on a distance between a geographic location associated with the user and a geographic location associated with the group, and/or based on any other suitable characteristics associated with the user and with the group. For example, if information maintained by the social networking system in association with a user's profile on the social networking system indicates that the user has an interest in surfing and is located in Los Angeles, Calif. and previous actions performed by the user on the social networking system include frequent check-ins to surf shops in Hawaii, the social networking system may recommend that the user join surfing groups located in Newport Beach, Calif. and Maui, Hi.

A recommendation to join a group may be presented to a viewing user in a recommendation unit that includes various elements, such as a title of the group, a cover photo for the group, photos associated with members of the group, an interactive element that allows the user to submit a request to join the group (e.g., a "join" button), and contextual information describing why the group is being recommended. Examples of types of contextual information that may be included in a recommendation unit include information describing the group (e.g., a geographic location associated with a group), information describing the group's similarity to another group of which the user is a member, information describing similarities in content posted by members of the group to content posted by members of another group currently being viewed by the user, and information describing users of the group (e.g., a total number of members in the group, photos of friends of the user who are members of the group, names of friends of the user who recently joined the group, etc.).

In various embodiments, the social networking system presents the viewing user with a recommendation unit that includes photos associated with members of a recommended group in a configuration that overlays a portion of a cover image or photo associated with the group. For example, if the recommendation unit recommends that a user join a group for the "Houston Quilting Club," and a cover image associated with the group is a photo of a quilt, photos of members of the group are presented in a window of the recommendation unit that overlays a portion of the cover photo. In other embodiments, the recommendation unit includes photos associated with members of a group that do not overlay a cover photo associated with the group. For example, if a recommendation to join a group is presented to a viewing user via a mobile device, photos associated with members of the group are shown in a recommendation unit instead of a cover photo associated with the group or vice versa. As an additional example, photos associated with members of a recommended group are presented in a recommendation unit in conjunction with, but do not overlap any portion of a cover photo associated with the group. The social networking system may select and/or arrange the photos associated with members of a recommended group based on an affinity of the viewing user for the members. For example, the social networking system identifies members of a recommended group that are connected to the viewing user on the social networking system and presents the user with a recommendation unit that includes profile photos of these members in an arrangement that is based on the types of relationships between the members and viewing user (e.g., family members of the viewing user are presented first, followed by friends, then coworkers, etc.).

To determine the viewing user's affinity for members of a recommended group, the social networking system may compute an affinity score that measures an affinity of the viewing user for each member of the group based on different weights associated with different types of information maintained by the social networking system. Examples of types of information that may be used to determine the viewing user's affinity for members of a group include information stored in connections between the users on the social networking system, a number or frequency of interactions between the users on the social networking system (e.g., messages sent to each other), information describing interactions with content associated with a member by the viewing user (e.g., a number of views of the member's profile information), a number/type of attributes the users have in common with each other (e.g., a number of friends or interests the users have in common), and similarities between various attributes of the users (e.g., similarities in geographic locations or occupations).

When computing an affinity score of the viewing user for members of a group, greater weights may be associated with information that is more likely to indicate an affinity of the viewing user for the members. For example, the social networking system associates a greater weight with the number of messages sent between the viewing user and a member of a group than with the number of common attributes shared by the viewing user and the member of the group and computes an affinity score of the viewing user for the member of the group based on the weights. In one embodiment, where connections do not exist between the viewing user and members of a recommended group on the social networking system, photos of group members are selected and/or arranged randomly, rather than based on an affinity of the viewing user for the members.

One or more recommendations may be presented to a user in a single recommendation unit. For example, the social networking system may present a scrollable recommendation unit to a user that includes multiple groups recommended by the social networking system. A recommendation unit may be presented in conjunction with content items included in a feed of content items (e.g., in a newsfeed) or independently (e.g., along the right-hand side of a display area of a client device used to access the social networking system). Additional types of content associated with a group may also be presented with a recommendation to join the group. For example, content posted by members of a group (e.g., videos and photos) may be presented instead of or in addition to photos of members of the group in a recommendation to join the group. The additional types of content may be presented in a configuration that overlays a cover photo associated with the group and may be arranged based on the viewing user's affinity for the additional types of content (e.g., based on the viewing user's affinity for objects or users tagged in the content).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
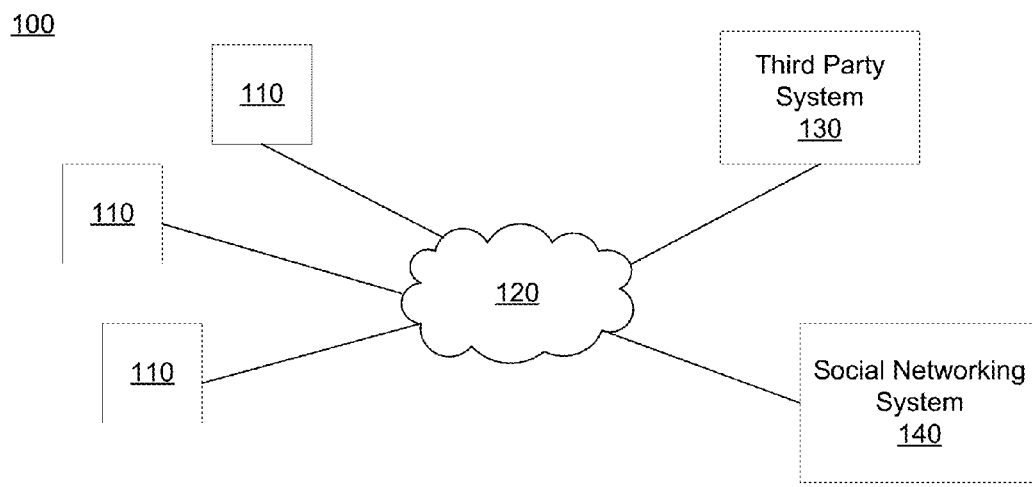
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third party systems 130, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the social networking system 140, such as advertisements, content, or information about an application provided by the third party system 130.

Figure 2:
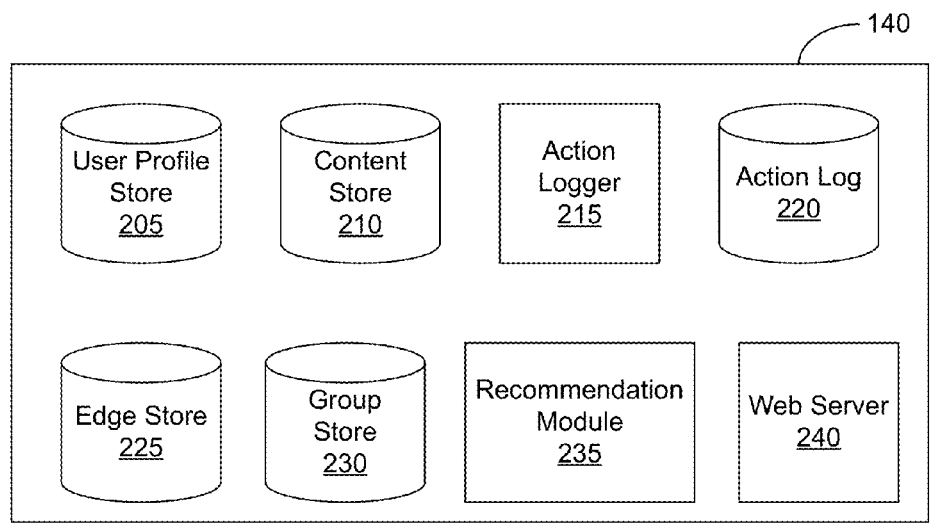
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a recommendation module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, locations and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

In some embodiments, user profile information stored in the user profile store 205 also includes information describing one or more groups maintained by the social networking system 140 that are associated with the corresponding social networking system user. For example, user profile information describes a user as an administrator or a member of a group. As an additional example, user profile information describes a date that a user joined or left a group.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

Edges between groups and other objects maintained by the social networking system 140 (e.g., users) store information about the relationships between the groups and the other objects (e.g., membership statuses, privileges, etc.). For example, an edge between a user and a group stores information that indicates whether the user is a current, prospective, or former member of the group, when the user joined or left the group, etc. Additional edges between a user and a group may identify interactions between the user and the group. For example, an edge connecting a user to a group represents a communication to the group from the user (e.g., a message sent in a group chat session). A group may also be connected to a subject matter associated with the group (e.g., biographic or geographic information common to group members, an interest or hobby shared by group members, etc.).

The social networking system 140 may retrieve information stored in the edge store 225 to make determinations about whether a user is a member of a group or is connected to a member of a group. For example, if the social networking system 140 determines that an edge exists between a user and a group, the social networking system 140 retrieves information stored in the edge to determine the user's relationship to the group. As an additional example, if the social networking system 140 determines that an edge does not exist between a user and a group, the social networking system 140 retrieves information stored in the edge store 225 to determine the user's relationship to members of the group, if any.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, published as U.S. Patent Publication No. US 2012/0166532 A1, U.S. patent application Ser. No. 13/690,254, filed on Nov. 30, 2012, published as U.S. Patent Publication No. US 2014/0156744 A1, U.S. patent application Ser. No.

13/689,969, filed on Nov. 30, 2012, published as U.S. Patent Publication No. US 2014/0156566 A1, and U.S. patent application Ser. No. 13/690,088, filed on Nov. 30, 2012, published as U.S. Patent Publication No. US 2014/0156360 A1, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 stores information associated with groups of social networking system users maintained by the social networking system 140, as described below in conjunction with step 305 of FIG. 3. An example of a type of information associated with a group that may be stored in the group store 230 includes information describing the group (e.g., a group photo or image, a group name, a group location, and a general description of members of the group). For example, a group called "2004 Cal Alumni" is described as alumni of the University of California, Berkeley graduating in 2004 and is associated with a group photo of its members. Another example of a type of information associated with a group that may be stored in the group store 230 includes content that may be shared or accessed by group members, such as shared photo albums, content uploaded by group members, group messages, group events, group files, a group content feed, a group calendar, etc. The group store 230 may also store information describing users associated with a group, including information identifying administrators and members of the group, information describing membership statuses of users associated with the group (e.g., current members and users whose memberships are pending approval), information describing email addresses of members of the group (e.g., in a group mailing list), etc.

The group store 230 may store subject matter associated with members of a group. Examples of subject matter associated with members of a group include: biographic or geographic information common to group members (e.g., members of a group may be family members or share a common workplace, school, graduating class year, current location, hometown, etc.), a hobby or interest shared by group members (e.g., a favorite sport, sports team, activity, celebrity, etc.), an art, an artist, or an entertainment format in which group members share an interest (e.g., a movie, an actor, a band, a music genre, a book, an author, a video game, a board game, etc.), and a political view, a religious view, a philosophy, a concept, or any other suitable characteristic common to group members. The group store 230 may also store information describing privacy settings associated with a group. For example, groups can be "open," in which anyone is allowed to join and view content associated with the group, or "closed," in which a user is required to request to join or be invited by an existing group member to join the group and some content associated with the group may only be viewed by members of the group. As an additional example, a group may be "private," in which a user may become a member only by invitation by an existing group member and information associated with the group may only be viewed by members of the group.

The recommendation module 235 determines a set of groups maintained by the social networking system 140 of which a viewing user is not a member. In some embodiments, the recommendation module 235 retrieves information from the edge store 225, the user profile store 205, and/or the group store 230 and determines one or more groups of which the viewing user is not a member based on the retrieved information. For example, if information retrieved by the recommendation module 235 from the edge store 225 indicates an edge does not exist between the viewing user and a group maintained by the social networking system 140, the recommendation module 235 determines that the viewing user is not a member of the group. As an additional example, the recommendation module 235 determines that the viewing user is not a member of a group if information stored in the user profile store 205 describing groups of which the viewing user is a member does not include the group or if information describing members of the group stored in the group store 230 does not include the viewing user.

In some embodiments, the groups determined by the recommendation module 235 exclude certain groups, even though the viewing user is not a member of those groups. For example, if information stored in the group store 230 indicates that a group is a private group, the recommendation module 235 may not include the group when determining the groups of which the viewing user is not a member, since the viewing user must be invited by a current member to join private groups. As an additional example, if stored information retrieved by the recommendation module 235 (e.g., from the edge store 225) indicates that the viewing user is a former member of a group or has not yet accepted an invitation to join a group or has requested to join a group but the request is still pending approval, the recommendation module 235 excludes these groups from the determined groups of which the viewing user is not a member. The recommendation module 235 may exclude these groups after groups of which the viewing user is not a member are identified. For example, the recommendation module 235 identifies all groups of which the viewing user is not a member and subsequently excludes private groups to determine the set of groups of which the viewing user is not a member. Alternatively, the recommendation module 235 may exclude certain groups while identifying groups of which the viewing user is not a member (e.g., by retrieving information from the group store 230 that describes only non-private groups). Determining the set of groups of which the viewing user is not a member is further described below in step 315 of FIG. 3.

The recommendation module 235 predicts an affinity between a viewing user and one or more groups of which the viewing user is not a member, where the affinity indicates a likelihood that the viewing user will join and subsequently interact with the group(s). The predicted affinity may be based on stored information retrieved by the recommendation module 235. The affinity between the viewing user and a group may be predicted based on information including a measure of similarity between information associated with content maintained by the social networking system 140 for which the viewing user has expressed an interest and information associated with the group. For example, if information retrieved from the group store 230 indicates that the viewing user is a former member of the "Harley Davidson Motorcycles" group, the recommendation module 235 predicts that the viewing user is likely to have an affinity for additional groups associated with motorcycles in general and is likely to have an even greater affinity for additional groups associated with Harley Davidson motorcycles. As an additional example, the recommendation module 235 predicts that the viewing user is not likely to have an affinity for a group if information retrieved from the group store 230 indicates that the group is associated with a particular football team and information retrieved from the user profile store 205 indicates that the viewing user is a fan of a rival football team.

Various types of information associated with a group and the viewing user may be used by the recommendation module 235 to predict the affinity between the viewing user and the group. For example, based on information stored in the group store 230 indicating that a group for the "Yosemite Hikers" is associated with subject matter that includes hiking and a geographic location of Yosemite National Park, information stored in the user profile store 205 indicating that one of the viewing user's interests includes hiking, and information stored in the action log 220 indicating that the viewing user recently checked into locations within a threshold distance of Yosemite National Park, the recommendation module 235 predicts that the viewing user is likely to have an affinity for the group. As an additional example, the recommendation module 235 predicts that a viewing user is likely to have an affinity for a group of fans of the author Dan Brown if information retrieved from the action log 220 indicates that the viewing user previously expressed a preference for content associated with a film adaptation of a book authored by Dan Brown and if information retrieved from the user profile store 205 indicates that the viewing user enjoys reading books that are of the same genre as those authored by Dan Brown.

The affinity between the viewing user and a group may be predicted based on a number of members of the group connected to the viewing user. For example, the recommendation module 235 predicts that the viewing user is likely to have an affinity for a group based on information retrieved from the edge store 225 indicating that the viewing user has established connections with several members of the group. Furthermore, the affinity between the viewing user and a group may be predicted based on a threshold measure of similarity between attributes associated with members of the group and attributes associated with the viewing user, a measure of similarity between one or more groups of which the viewing user is a member and the group, and a distance between a geographic location associated with the group and a geographic location associated with the viewing user.

Additionally, the recommendation module 235 may predict an affinity between the viewing user and one or more groups of which the viewing user is not a member based on information describing content that is currently being presented to the viewing user. For example, if the viewing user is currently being presented with a video tutorial on baking cookies, the recommendation module 235 predicts that the viewing user is likely to have an affinity for local baking groups. In some embodiments, the recommendation module 235 predicts the affinity between the viewing user and a group of which the viewing user is not a member using a machine-learning model (e.g., a model trained based on historical interactions between users having a threshold similarity to the viewing user and one or more groups of which the viewing user is not a member). The predicted affinity between the viewing user and a group of which the viewing user is not a member may be expressed as an affinity score computed by the recommendation module 235. The recommendation module 235 may compute an affinity score based on a measure of similarity between stored information describing interests associated with the viewing user and information associated with a group of which the viewing user is not a member. For example, if information stored in the user profile store 205 indicates that hobbies of the viewing user include scuba diving and water skiing, the recommendation module 235 computes a higher affinity score for groups associated with similar subject matter, such as jet skiing, surfing, and other water sports, than for groups associated with non-aquatic sporting activities. Predicting an affinity between a viewing user and one or more groups of which the viewing user is not a member is further described below in step 320 of FIG. 3.

Figure 3:
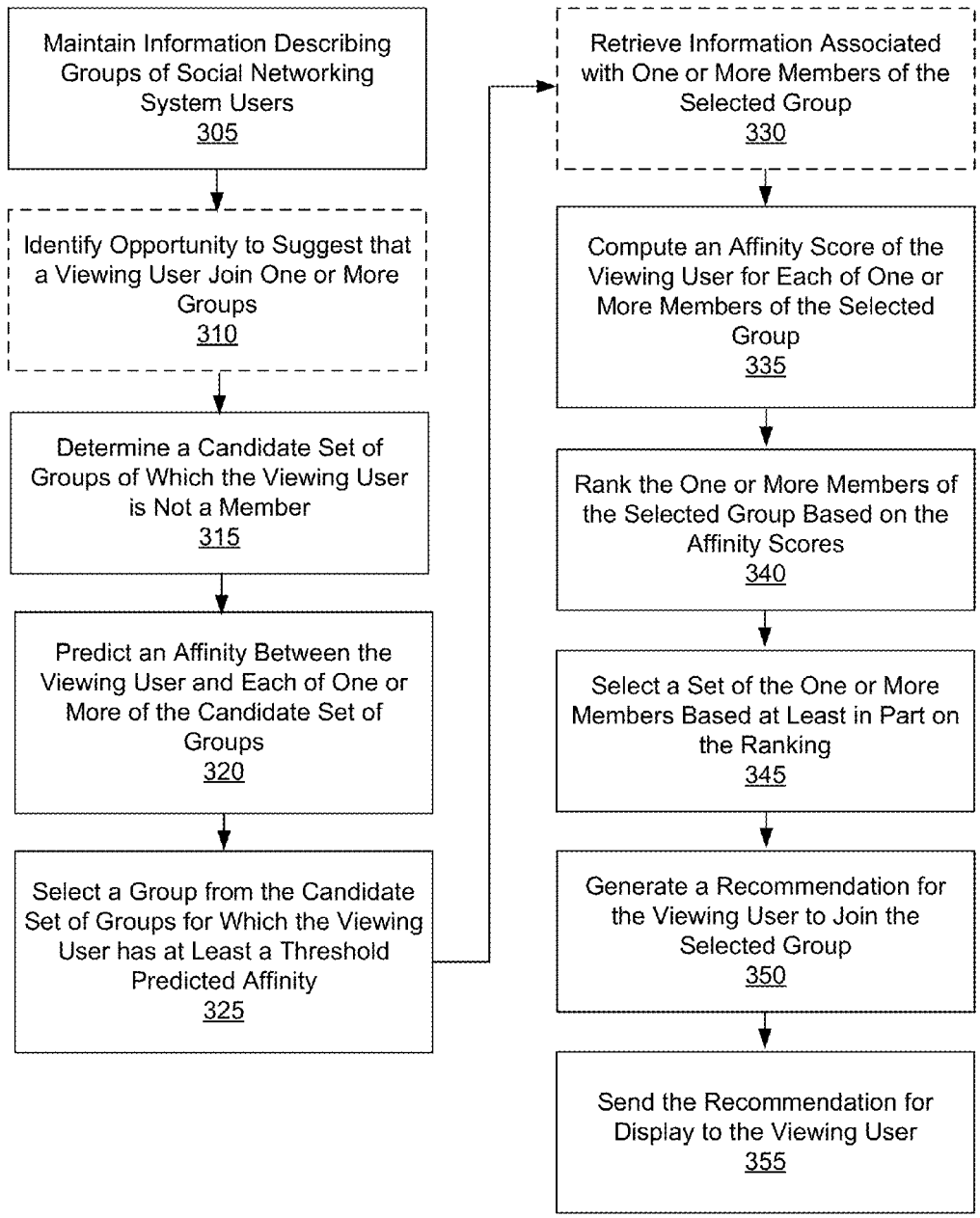
FIG. 3 is a flowchart of a method for recommending that a viewing user of a social networking system join a group maintained by the social networking system, in accordance with an embodiment.

In one embodiment, the recommendation module 235 selects a group for recommendation to a viewing user if the viewing user has at least a threshold predicted affinity for the group, as described in step 325 of FIG. 3. For example, the recommendation module 235 selects the group for recommendation to the viewing user if the viewing user has established connections with at least a threshold number or percentage of members of the group. The recommendation module 235 may retrieve information maintained by the social networking system 140 that identifies members of the group selected for recommendation to the viewing user, as discussed below in step 330 of FIG. 3. For example, the recommendation module 235 retrieves information identifying members of a group from the group store 230, information associated with the members of the group (e.g., demographic information) from the user profile store 205, information describing objects to which members of the group are connected from the edge store 225, and/or information describing actions previously performed by members of the group from the action log 220.

The recommendation module 235 computes an affinity score of a viewing user for each of one or more members of a group selected for recommendation to the viewing user based on the retrieved information associated with members of the selected group. In various embodiments, the recommendation module 235 computes the affinity scores based on information describing one or more connections between the viewing user and members of the selected group. For example, the recommendation module 235 retrieves information stored in connections between the viewing user and members of a group describing relationships between the viewing user and the members and computes higher affinity scores for members having close relationships with the viewing user (e.g., family members, significant others, and friends) than for members not having close relationships with the viewing user (e.g., co-workers, classmates, etc.). The recommendation module 235 may also compute the affinity scores based on information describing one or more interactions between the viewing user and members of the selected group. For example, the recommendation module 235 retrieves information describing previous interactions between the viewing user and members of a group (e.g., from the edge store 225 or action log 220) and computes higher affinity scores for members that have interacted more frequently and more recently with the viewing user than for members that have interacted less frequently and less recently with the viewing user.

In various embodiments, the recommendation module 235 computes the affinity scores based on a measure of similarity between information associated with the viewing user and information associated with members of the selected group. For example, the recommendation module 235 computes higher affinity scores for members of a group that have several friends in common with the viewing user than for members of the group that have no friends in common with the viewing user. As an additional example, the recommendation module 235 retrieves photos in which the viewing user and members of a group are both tagged (e.g., from the content store 210) and computes higher affinity scores for members that are tagged in more photos with the viewing user than for members that are tagged in fewer photos with the viewing user.

The recommendation module 235 may compute a similarity score describing a measure of similarity between various attributes associated with the viewing user and corresponding attributes associated with a member of the selected group and compute the affinity score based on the similarity scores. For example, if the viewing user is a 21-year-old male who lives in San Francisco and has an interest in basketball, the recommendation module 235 computes a higher affinity score for a member of a group that is also male, between the ages of 18 and 24, who lives in California and has an interest in team sports than for a member of the group who is female, between the ages of 45 and 60, who lives in Montana and has an interest in horseback riding. In the previous example, the recommendation module 235 assigns a similarity score between 0 and 1 to each of the four attributes of the group members (i.e., age, gender, geographic location, and interests) based on their degree of similarity to those of the viewing user and computes the affinity score for the members by summing the similarity scores.

In one embodiment, the recommendation module 235 associates weights with different attributes associated with the viewing user having at least a threshold measure of similarity to attributes associated with members of the selected group and computes the affinity score for each member of the group based on the weights. For example, the recommendation module 235 associates greater weights with attributes relating to the viewing user's connections with members of the group and the viewing user's previous interactions with members of the group than with attributes relating to demographic information the viewing user has in common with members of the group. In some embodiments, the recommendation module 235 computes the affinity score of the viewing user for one or more members of the group using a machine-learning model. Computing an affinity score of the viewing user for a member of the selected group is further described below in step 335 of FIG. 3.

The recommendation module 235 may select a set of members of a group selected for recommendation to the viewing user associated with at least a threshold affinity score. Alternatively, the recommendation module 235 may rank members of the group and select a set of members based on the ranking. For example, the recommendation module 235 ranks members of the group based on the affinity scores computed for each member and selects the three highest ranked members. Ranking and selecting members of the selected group are further described in conjunction with FIG. 3, in steps 340 and 345, respectively.

The recommendation module 235 generates a recommendation for a viewing user to join a group, where the recommendation may be associated with a recommendation unit that includes various elements, as further described below in step 350 of FIG. 3. Examples of elements that may be included in the recommendation unit include a description of the recommended group (e.g., a title/name of the group), a cover photo/image for the group, contextual information describing why the group is being recommended (e.g., information describing the group's similarity to another group of which the user is a member), information describing users having connections to the viewing user who are members of the group (e.g., photos of friends of the viewing user who are members of the group or a number of members of the group having stored connections to the viewing user), and an interactive element (e.g., hyperlinked text or an image) that allows the viewing user to submit a request to the social networking system 140 to join the group (e.g., a "join" button).

The recommendation may be presented in a scrollable recommendation unit that includes multiple groups recommended by the social networking system 140, as discussed in step 355 of FIG. 3. In one embodiment, the recommendation is presented in conjunction with content items included in a feed of content items (e.g., in a newsfeed). In another embodiment, the recommendation is presented independently (e.g., along the side of a display area of a client device used to access the social networking system 140). Information describing recommending groups to a viewing user is further described below in conjunction with FIGS. 3, 4, and 5.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Recommending Groups to a Social Networking System User

FIG. 3 is a flowchart of one embodiment of a method for recommending that a viewing user of a social networking system 140 join a group maintained by the social networking system 140. In other embodiments, the method may include different and/or additional steps than those shown in FIG. 3. Additionally, steps of the method may be performed in different orders than the order described in conjunction with FIG. 3. Furthermore, steps of the method may involve or be performed by components of the social networking system 140, such as the group store 240 and recommendation module 245.

The social networking system 140, e.g., the group store 240 as described above in conjunction with FIG. 2, maintains 305 information describing a plurality of groups. Each group maintained 305 by the social networking system 140 is associated with one or more interests shared by social networking system users that are members of the same group. For example, members of a group may be family members, classmates, coworkers, or users that share a common interest. Examples of types of information associated with each group that are maintained 305 by the social networking system 140 include a group name, a group description, a group photo, a geographic location, and information identifying group members. For example, information maintained 305 by the social networking system 140 in conjunction with the group "Napa County Tennis Club" includes a description of the group as a group of users of the social networking system 140 who play tennis in Napa county, a cover photo for the group, a Northern California Bay Area location, a calendar of past and upcoming group tournaments, a list of group members, a shared group photo album, etc. As an additional example, the social networking system 140 maintains 305 group message boards and group content feeds, allowing members of a group to easily connect to and share content with additional users that are members of the same group.

According to some embodiments, the social networking system 140 identifies 310 an opportunity to suggest that a viewing user of the social networking system 140 join one or more of the plurality of groups. For example, the social networking system 140 may identify 310 an opportunity to suggest that a user viewing content on the social networking system 140 join a group when it receives a request from the user to present content to the user via a client device 110 associated with the user. Alternatively, the social networking system 140 may identify such opportunities independent from any request by the user.

From the plurality of groups, the social networking system 140 determines 315 a candidate set of groups to be recommended to the viewing user. The candidate set of groups may be determined 315 by a component of the social networking system 140, e.g., the recommendation module 235 as described above in conjunction with FIG. 2. The social networking system 140 determines 315 the candidate set of groups by identifying groups of which the viewing user is not a member. For example, if information retrieved by the social networking system 140 indicates that an edge does not exist between the viewing user and a group maintained by the social networking system 140, the social networking system 140 determines 315 that the viewing user is not a member of the group. As an additional example, the social networking system 140 determines 315 that the viewing user is not a member of a group if information describing members of the group (e.g., in a group mailing list) stored by the social networking system 140 does not include information identifying the viewing user as a member of the group.

In some embodiments, the social networking system 140 excludes certain groups, even though the viewing user is not a member in the candidate set of groups. For example, if information about a group retrieved by the social networking system 140 indicates that a group is a private group, the social networking system 140 does not include the group in the candidate set of groups since the viewing user must be invited by a current member to join the group. As an additional example, if information stored in a connection between the viewing user and a group indicates that the viewing user is a former member of the group or has not yet accepted an invitation to join the group, the social networking system 140 may not identify the group in the candidate set of groups. The social networking system 140 may exclude these groups after identifying groups of which the viewing user is not a member. For example, the social networking system 140 determines 315 the set of groups by identifying all groups of which the viewing user is not a member and by subsequently excluding certain groups from those identified (e.g., private groups, groups that the viewing user has requested to join, in which the requests have been denied or are pending approval, etc.). Alternatively, the social networking system 140 may exclude certain groups while identifying groups of which the viewing user is not a member (e.g., by retrieving information describing only non-private groups and groups of which the viewing user has never been a member) when determining 315 the set of groups of which the viewing user is not a member.

The social networking system 140 (e.g., the recommendation module 235 as described in conjunction with FIG. 2) predicts 320 an affinity between the viewing user and each of one or more of the candidate set of groups indicating a likelihood that the viewing user will join a group and interact with the group after becoming a member of the group. The social networking system 140 predicts 320 the affinity based on information maintained by the social networking system 140. In one embodiment, the social networking system 140 predicts 320 an affinity between the viewing user and a group based on similarities between the user's interests and a description of the group, based on a distance between a geographic location associated with the user and a geographic location associated with the group, or based on any other suitable characteristics associated with the user and the group. For example, if previous actions performed by the viewing user on the social networking system 140 indicates that the viewing user is a former member of a group for roller coaster enthusiasts, the social networking system 140 predicts 320 that the viewing user is likely to have an affinity for additional groups associated with roller coasters. As an additional example, the social networking system 140 predicts 320 that the viewing user is likely to have an affinity for a group based on information retrieved from edges between members of the group and the viewing user indicating that several friends and family members of the viewing user are members of the group.

The social networking system 140 may predict 320 the affinity between the viewing user and the group based on various types of information associated with the group and the viewing user. For example, based on stored information indicating that a group for "California Equestrian" is associated with subject matter that includes horseback riding and a geographic location of the state of California and stored information indicating that the viewing user is a horseback riding instructor and that the viewing user has recently checked into locations within California, the social networking system 140 predicts that the viewing user is likely to have an affinity for the group. As an additional example, the social networking system 140 predicts that a viewing user is likely to have an affinity for a group of fans of the Star Wars film series if stored information indicates that the viewing user previously expressed a preference for content associated with a television series of the same genre and commented on content associated with additional films by the same film maker.

The social networking system 140 may also predict 320 an affinity between the viewing user and a group based on information describing content that is currently being presented to the viewing user. For example, if the viewing user is currently viewing a page for a ballroom dancing group, the social networking system 140 predicts 320 that the viewing user is likely to have an affinity for additional ballroom dancing groups associated with a geographic location within a threshold distance from a geographic location associated with the viewing user. In some embodiments, the social networking system 140 predicts 320 the affinity between the viewing user and a group using a machine-learning model that predicts 320 affinities based on historical interactions of social networking system users having a threshold similarity to the viewing user and groups having a threshold similarity to the candidate set of groups. The predicted affinity between the viewing user and a group may be expressed as an affinity score computed by the social networking system 140. The social networking system 140 may compute an affinity score based on a measure of similarity between stored information describing interests associated with the viewing user and information associated with a group. For example, if stored information indicates that a hobby of the viewing user includes ballet dancing, the social networking system 140 computes a higher affinity score for groups associated with similar subject matter, such as ballet companies, than for groups associated with other types of dancing activities.

Based on the predicted affinities, the social networking system 140 selects 325 a group from the candidate set of groups for inclusion in a recommendation that the viewing user join the selected group. In some embodiments, the social networking system 140 selects 325 a group if it is associated with at least a threshold predicted affinity. For example, the social networking system 140 selects 325 a group from the candidate set of groups with the greatest number of members that are connected to the viewing user. In some embodiments, the social networking system 140 selects 325 multiple groups from the candidate set of groups of which the viewing user is not a member to recommend to the viewing user. As described above in conjunction with FIG. 2, the group may be selected 325 from the candidate set of groups by the recommendation module 235.

Figure 4:
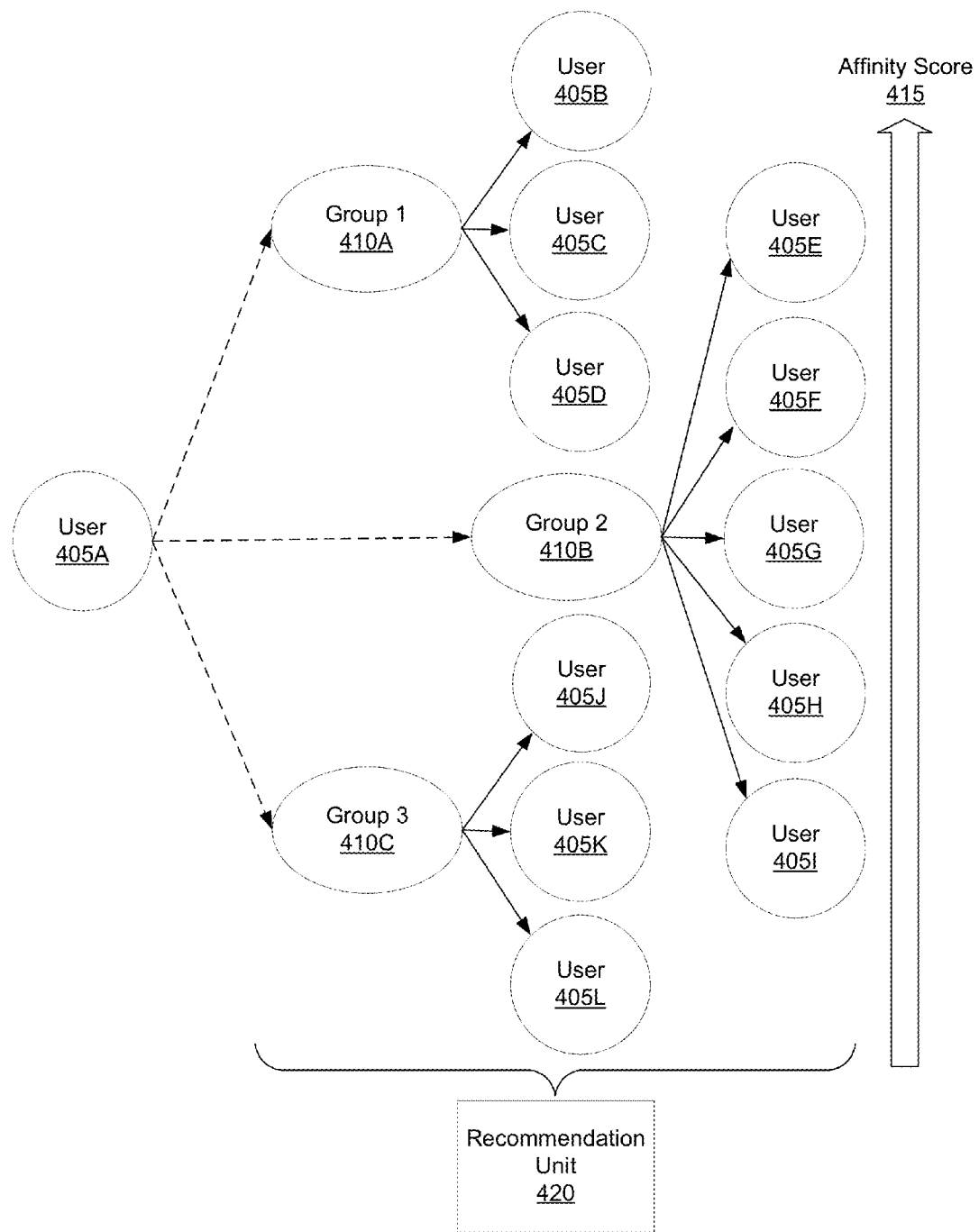
FIG. 4 is a conceptual diagram of selecting a group to recommend to a viewing user of a social networking system and a set of members of the group to include in a recommendation to join the group, in accordance with an embodiment.
Figure 5:
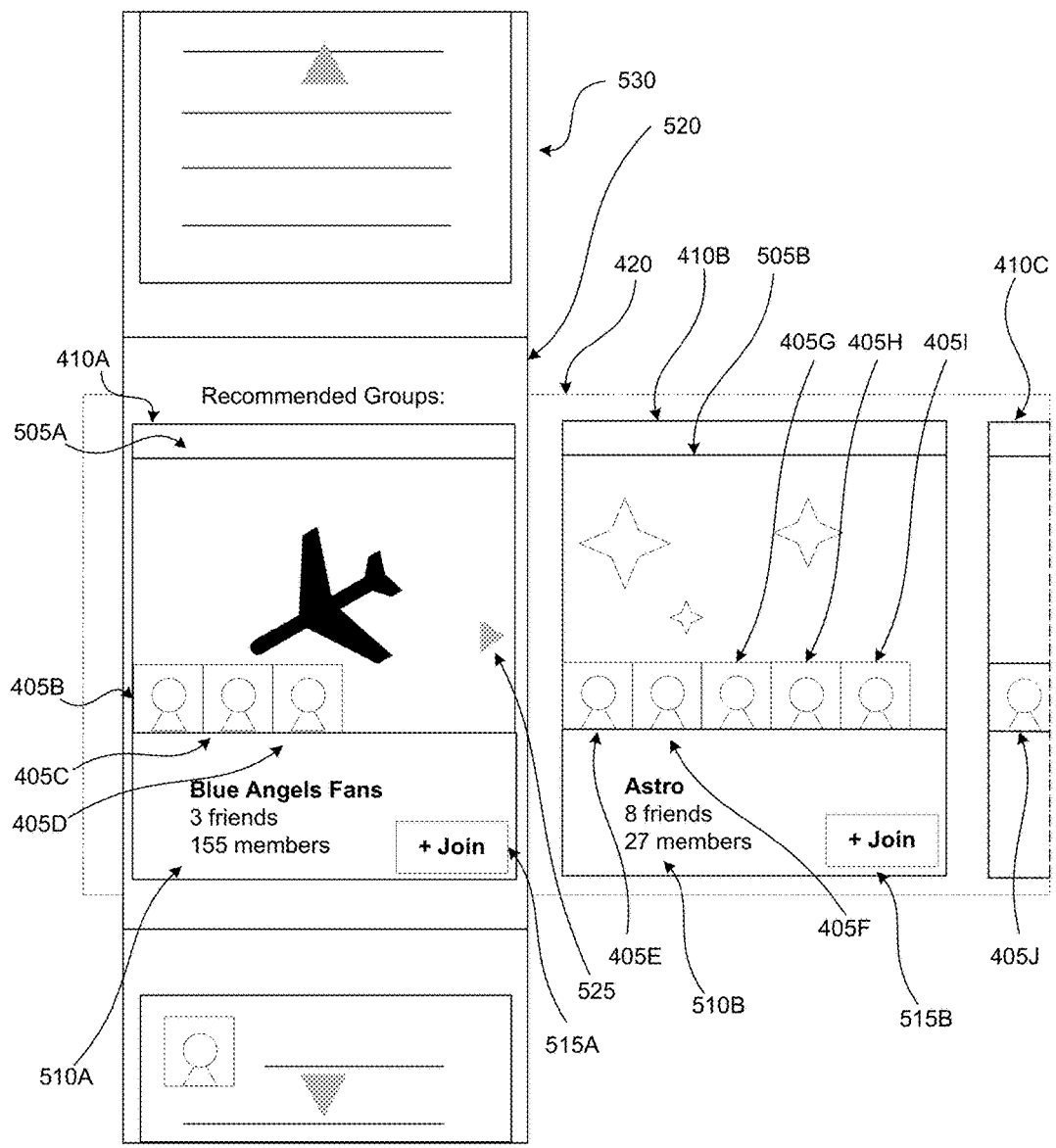
FIG. 5 is an example user interface for presenting a recommendation that a viewing user of a social networking system join one or more groups maintained by the social networking system, in accordance with an embodiment.

FIGS. 4 and 5 depict the selection of groups and members of the selected groups for recommendation to the viewing user and an example user interface for presenting the recommendation, respectively. In the example of FIG. 4, the social networking system 140 selects 325 three groups 410A-C from the candidate set of groups 410 associated with the greatest predicted affinities to recommend to the viewing user 405A. The social networking system 140 may also rank the candidate set of groups 410 by their predicted affinities and select 325 the group 410 having a specified (e.g., highest) rank.

According to some embodiments, to provide the viewing user 405A with contextual information about the selected group 410, the social networking system 140, e.g., the recommendation module 235 as described in conjunction with FIG. 2, retrieves 330 information associated with one or more members of the selected group 410. In one embodiment, the social networking system 140 identifies members of the selected group 410 based on information stored in conjunction with information identifying the group 410 (e.g., a group membership list or mailing list) and optionally retrieves 330 stored information associated with the identified members (e.g., profile information, information describing connections between the members and additional users of the social networking system 140, etc.). As shown in FIG. 4, in embodiments in which the social networking system 140 selects 325 multiple groups 410A-C to recommend to the viewing user 405A, the social networking system 140 may identify members 405B-L of one or more selected groups 410A-C based on information stored in connections between the groups 410A-C and one or more members 405B-L of the groups 410A-C and retrieve stored information associated with the identified members 405B-L. The social networking system 140 may retrieve 330 the information associated with members of the selected group 410 subject to one or more privacy settings associated with the members. For example, if a privacy setting associated with a member of the selected group 410 limits sharing or disclosure of certain information on the social networking system 140, the social networking system 140 may not retrieve 330 information associated with the member of the selected group 410.

Based on the retrieved information, the social networking system 140 (e.g., the recommendation module 235 as described above in FIG. 2) computes 335 an affinity score of the viewing user 405A for the members of the selected group 410 that measures an affinity of the viewing user 405A for a member of the selected group 410. The social networking system 140 may compute 335 the affinity score of the viewing user 405A for a member of the selected group 410 based on information stored in connections between the users (e.g., information indicating a type of relationship between the users), information describing a number or frequency of interactions between the users on the social networking system 140 (e.g., a number of instant messages sent between the users), information describing interactions with content posted by the member by the viewing user 405A or vice versa (e.g., a number of comments by the viewing user 405A on content posted by the member), information describing a number/type of attributes the users have in common with each other (e.g., a number of friends the users have in common), or information describing similarities between attributes associated with the users (e.g., types of demographic information). For example, in FIG. 4, if stored information indicates that the viewing user 405A and a member 405B of a selected group 410A have several interests in common while the viewing user 405A and an additional member 405C of the selected group 410A have fewer interests in common, the social networking system 140 computes 335 a greater affinity score 415 of the viewing user 405A for the member 405B of the selected group 410A than for the additional member 405C of the selected group 410A.

In some embodiments, the social networking system 140 computes 335 the affinity score 415 based on different weights associated with different types of information that may be used to determine the viewing user's affinity for members of the group 410, where greater weights are associated with information that is more likely to indicate an affinity of the viewing user 405A for the members. For example, the social networking system 140 associates a greater weight with a connection established between the viewing user 405A and a member of the selected group 410 than with similar ages shared by the viewing user 405A and the group member and computes 335 an affinity score 415 of the viewing user 405A for the group member based on the weights. As an additional example, the social networking system 140 associates a greater weight with information stored in a connection between the viewing user 405A and a member of the selected group 410 indicating a close relationship between the users (e.g., family members and significant others) than with information indicating that the users do not have a close relationship (e.g., business acquaintances). In one embodiment, the social networking system 140 computes 335 the affinity score 415 of the viewing user 405A for members of the selected group 410 using a machine-learning model that predicts affinities based on historical interactions of social networking system users having a threshold similarity to the viewing user 405A and users having a threshold similarity to the members of the group 410.

Based on the computed affinity scores 415, the social networking system 140 ranks 340 the members of the selected group 410. For example, the social networking system 140 associates higher ranks with group members associated with higher affinity scores 415 than with group members associated with lower affinity scores 415. Based on the ranking 340, the social networking 140 system selects 345 a set of members of the selected group 410. For example, the social networking system 140 selects 345 a set of highest ranked members in the previous example. In one embodiment, the social networking system 140 selects 345 a set of members of the group 410 associated with at least a threshold affinity score 415. The members of the selected group 410 may be ranked 340 and selected 345 by the recommendation module 235 as described above in conjunction with FIG. 2.

The social networking system 140 (e.g., the recommendation module 235 as described in FIG. 2) generates 350 a recommendation for the viewing user 405A to join the selected group 410. As shown in the example of FIG. 4, the recommendation is generated 350 for presentation to the viewing user 405A via a recommendation unit 420. In some embodiments, the recommendation unit 420 includes various elements such as a title or name of the group 410, a cover photo or image associated with the group 410, an interactive element (e.g., hyperlinked text or images) that presents the viewing user 405A with an option to request to join the group 410 (e.g., a "join" button), information describing each of the selected set of members of the selected group 410 (e.g., one or more images associated with each member), and contextual information describing why the group 410 is being recommended to the viewing user 405A.

The images associated with the selected set of members of the group 410 may overlay at least a portion of the cover photo/image associated with the group 410, where the images associated with the members are arranged within the recommendation unit 420 based on the ranking. In the example of FIG. 5, if a group 410A for the "Blue Angels Fans" is recommended to the viewing user 405A and the cover photo 505A associated with the group 410A is a photo of an aircraft belonging to the Blue Angels flight squadron, profile photos of selected members 405B-D of the group 410A are presented in a window that occupies the bottom left corner of the cover photo 505A and are arranged in order from left to right based on the ranking 340; the recommendation also includes information describing the group 510A (e.g., the name of the group 410, a number of friends of the viewing user 405A that are members of the group 410, a number of members of the group 410) and a "join" button 515A with which the viewing user 405A may interact to submit a request to the social networking system 140 to join the group 410A. In embodiments where connections do not exist between the viewing user 405A and members of a recommended group 410 on the social networking system 140, photos of group members may be selected and/or arranged randomly, rather than based on an affinity of the viewing user 405A for the members. Examples of types of contextual information that may be included with a recommendation to join the selected group 410 include information describing a geographic location associated with the group 410 relative to the viewing user's geographic location, information describing the group's similarity to another group 410 of which the viewing user 405A is a member, similarities in content posted by members of the group 410 to content posted by members of another group 410 currently being viewed by the viewing user 405A, and information describing users of the group 410 (e.g., profile pictures associated with friends of the viewing user 405A who are members of the group 410).

Multiple groups 410 may be recommended to the viewing user 405A in a single recommendation unit 420. For example, in FIG. 5, the recommendation unit 420 may include a display area 520 that presents information describing one or more groups 410 recommended to the viewing user 405A and includes a navigational element 525 that enables the viewing user 405A to view information describing additional recommended groups 410B-C (e.g., by interacting with a button 525 or scroll bar to view the additional recommended groups 410B-C). In embodiments where multiple groups 410 are included in a recommendation unit 420, the social networking system 140 may arrange the groups 410 within the recommendation unit 420 based on the predicted affinities between the viewing user 405A and the groups 410.

Additional types of content associated with the selected group 410 may also be included in a recommendation to join the group 410. For example, videos and other types of content posted by members of the selected group 410 are included instead of or in addition to photos of members of the group 410. The additional types of content may be arranged based on the viewing user's affinity for the additional types of content. For example, content associated with the group 410 are arranged based on the viewing user's affinity for objects or users tagged in the content.

In various embodiments, the social networking system 140 does not overlay photos or images associated with selected members of the selected group 410 on a cover photo or image 505 associated with the group 410 in the recommendation to join the group 410. For example, if the recommendation unit 420 is generated 350 for presentation to the viewing user 405A on a mobile device, the recommendation unit 420 includes a cover photo 505 associated with the group 410 or photos associated with the selected set of members of the group 410, but typically not both. As an additional example, the recommendation unit 420 for the selected group 410 includes photos associated with members of the group 410 arranged adjacent to a cover photo 505 associated with the group 410 but do not overlap any portion of the cover photo 505.

The social networking system 140 (e.g., the recommendation module 235 as described in conjunction with FIG. 2) sends 355 the generated recommendation for display to the viewing user 405A. The recommendation may be sent 355 for display to the viewing user 405A in conjunction with content items included in a feed of content items. For example, in FIG. 5, the recommendation unit 420 is presented to the viewing user 405A in a newsfeed 530 associated with the viewing user's profile. Alternatively, the recommendation may be sent 355 for display to the viewing user 405A independently (e.g., along the right-hand side of a display area of a client device 110 used to access the social networking system 140).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining information at a social networking system describing a plurality of groups, each group having a plurality of members and each member being a user of the social networking system;
    identifying an opportunity to suggest, to a viewing user of the social networking system, that the viewing user join one or more of the plurality of groups;
    determining a candidate set of groups from the plurality of groups, where the viewing user is not a member of any of the candidate set of groups;
    predicting an affinity between the viewing user and each of one or more of the candidate set of groups;
    selecting a group from the candidate set of groups, where the viewing user has at least a threshold predicted affinity for the selected group;
    retrieving information associated with one or more members of the selected group;
    computing an affinity score of the viewing user for each of the one or more members of the selected group based at least in part on one or more stored connections between the viewing user and the one or more members of the selected group;
    ranking the one or more members of the selected group based on the computed affinity scores;
    selecting a set of the one or more members of the selected group based at least in part on the ranking;
    generating a recommendation for the viewing user to join the selected group, the recommendation comprising an arrangement of one or more images associated with each of the selected set of members of the selected group overlaying at least a portion of an image associated with the group, the images arranged within the recommendation based on the ranking; and
    sending the recommendation for display to the viewing user.

2. The method of claim 1, wherein the affinity score of the viewing user for each of the one or more members of the selected group is based at least in part on a measure of similarity of an attribute associated with the viewing user to an attribute associated with each of the one or more members of the selected group.

3. The method of claim 2, further comprising:
    associating weights with one or more attributes associated with the viewing user having at least a threshold measure of similarity to one or more attributes associated with each of the one or more members of the selected group; and
    computing the affinity score of the viewing user for each of the one or more members of the selected group based at least in part on the weights.

4. The method of claim 1, wherein the affinity score of the viewing user for each of the one or more members of the selected group is computed based at least in part on information stored in conjunction with the one or more stored connections between the viewing user and the one or more members of the selected group.

5. The method of claim 1, wherein the selected set of the one or more members of the selected group are associated with at least a threshold affinity score.

6. The method of claim 1, wherein the recommendation to join the selected group further comprises one or more selected from a group consisting of: a description of the selected group, a number of members of the selected group having stored connections to the viewing user, a number of members of the selected group, information describing one or more members of the selected group, information describing a predicted affinity of the viewing user for the selected group, an option to request to join the selected group, one or more content items associated with the selected group, and any combination thereof.

7. The method of claim 1, wherein the recommendation to join the selected group is sent for display to the viewing user in conjunction with a feed of content items.

8. The method of claim 1, wherein the predicted affinity of the viewing user for each of one or more of the candidate set of groups is based at least in part on one or more selected from a group consisting of: a measure of similarity between information associated with content maintained by the social networking system for which the viewing user has expressed an interest and information associated with a candidate group, a number of members of the candidate group connected to the viewing user, a threshold measure of similarity between attributes associated with members of the candidate group and attributes associated with the viewing user, a measure of similarity between one or more groups of which the viewing user is a member and the candidate group, a distance between a geographic location associated with the candidate group and a geographic location associated with the viewing user, and any combination thereof.

9. The method of claim 1, wherein the candidate set of groups is determined from the plurality of groups subject to one or more privacy settings associated with the plurality of groups.

10. The method of claim 1, wherein the information associated with one or more members of the selected group is retrieved subject to a privacy setting associated with the one or more members.

11. A computer program product comprising a non-transitory computer readable storage medium having instructions encoded therein that, when executed by a processor, cause the processor to:
  maintain information at a social networking system describing a plurality of groups, each group having a plurality of members and each member being a user of the social networking system;
  identify an opportunity to suggest, to a viewing user of the social networking system, that the viewing user join one or more of the plurality of groups;
  determine a candidate set of groups from the plurality of groups, where the viewing user is not a member of any of the candidate set of groups;
  predict an affinity between the viewing user and each of one or more of the candidate set of groups;
  selecting a group from the candidate set of groups, where the viewing user has at least a threshold predicted affinity for the selected group;
  retrieve information associated with one or more members of the selected group;
  compute an affinity score of the viewing user for each of the one or more members of the selected group based at least in part on one or more stored connections between the viewing user and the one or more members of the selected group;
  rank the one or more members of the selected group based on the computed affinity scores;
  select a set of the one or more members of the selected group based at least in part on the ranking;
  generate a recommendation for the viewing user to join the selected group, the recommendation comprising an arrangement of one or more images associated with each of the selected set of members of the selected group overlaying at least a portion of an image associated with the group, the images arranged within the recommendation based on the ranking; and
  send the recommendation for display to the viewing user.

12. The computer program product of claim 11, wherein the affinity score of the viewing user for each of the one or more members of the selected group is based at least in part on a measure of similarity of an attribute associated with the viewing user to an attribute associated with each of the one or more members of the selected group.

13. The computer program product of claim 12, wherein the non-transitory computer readable storage medium further has instructions encoded thereon that, when executed by the processor, cause the processor to:
  associate weights with one or more attributes associated with the viewing user having at least a threshold measure of similarity to one or more attributes associated with each of the one or more members of the selected group; and
  compute the affinity score of the viewing user for each of the one or more members of the selected group based at least in part on the weights.

14. The computer program product of claim 11, wherein the affinity score of the viewing user for each of the one or more members of the selected group is computed based at least in part on information stored in conjunction with the one or more stored connections between the viewing user and the one or more members of the selected group.

15. The computer program product of claim 11, wherein the selected set of the one or more members of the selected group are associated with at least a threshold affinity score.

16. The computer program product of claim 11, wherein the recommendation to join the selected group further comprises one or more selected from a group consisting of: a description of the selected group, a number of members of the selected group having stored connections to the viewing user, a number of members of the selected group, information describing one or more members of the selected group, information describing a predicted affinity of the viewing user for the selected group, an option to request to join the selected group, one or more content items associated with the selected group, and any combination thereof.

17. The computer program product of claim 11, wherein the recommendation to join the selected group is sent for display to the viewing user in conjunction with a feed of content items.

18. The computer program product of claim 11, wherein the predicted affinity of the viewing user for each of one or more of the candidate set of groups is based at least in part on one or more selected from a group consisting of: a measure of similarity between information associated with content maintained by the social networking system for which the viewing user has expressed an interest and information associated with a candidate group, a number of members of the candidate group connected to the viewing user, a threshold measure of similarity between attributes associated with members of the candidate group and attributes associated with the viewing user, a measure of similarity between one or more groups of which the viewing user is a member and the candidate group, a distance between a geographic location associated with the candidate group and a geographic location associated with the viewing user, and any combination thereof.

19. The computer program product of claim 11, wherein the candidate set of groups is determined from the plurality of groups subject to one or more privacy settings associated with the plurality of groups.

20. The computer program product of claim 11, wherein the information associated with one or more members of the selected group is retrieved subject to a privacy setting associated with the one or more members.

21. A method comprising:
  maintaining information at a social networking system describing a plurality of groups, each group having a plurality of members and each member being a user of the social networking system;
  identifying an opportunity to suggest, to a viewing user of the social networking system, that the viewing user join one or more of the plurality of groups;
  determining a candidate set of groups from the plurality of groups, where the viewing user is not a member of any of the candidate set of groups;
  predicting an affinity between the viewing user and each of one or more of the candidate set of groups;
  selecting a group from the candidate set of groups, where the viewing user has at least a threshold predicted affinity for the selected group;
  retrieving information associated with one or more members of the selected group;
  computing an affinity score of the viewing user for each of the one or more members of the selected group based at least in part on the retrieved information associated with one or more members of the selected group and information associated with the viewing user;

selecting a set of the one or more members of the selected group based at least in part on the computed affinity scores; and generating a recommendation for the viewing user to join the selected group, the recommendation comprising an arrangement of one or more images associated with each of the selected set of members of the selected group overlaying at least a portion of an image associated with the group, the images arranged within the recommendation based on the computed affinity scores.

22. The method of claim 21, further comprising:

sending the recommendation for display to the viewing user.

23. The method of claim 21, wherein selecting a set of the one or more members of the selected group based at least in part on the computed affinity scores comprises:

ranking the one or more members of the selected group based on the computed affinity scores; and selecting a set of the one or more members of the selected group based at least in part on the ranking.

24. The method of claim 21, wherein the affinity score of the viewing user for each of the one or more members of the selected group is computed based at least in part on a set of connections between the viewing user and each of the one or more members of the identified group.

25. A method comprising:

maintaining information at a social networking system describing a plurality of groups, each group having a plurality of members and each member being a user of the social networking system;

determining a candidate set of groups to suggest that the viewing user join, the candidate set of groups selected from the plurality of groups, where the viewing user is not a member of any of the candidate set of groups;

predicting an affinity between the viewing user and each of one or more of the candidate set of groups;

selecting a group from the candidate set of groups, where the viewing user has at least a threshold predicted affinity for the selected group;

computing an affinity score of the viewing user for each of the one or more members of the selected group based at least in part on one or more stored connections between the viewing user and the one or more members of the selected group;

ranking the one or more members of the selected group based on the computed affinity scores;

selecting a set of the one or more members of the selected group based at least in part on the ranking;

generating a recommendation for the viewing user to join the selected group, the recommendation comprising an arrangement of one or more images associated with each of the selected set of members of the selected group arranged within the recommendation based on the ranking; and sending the recommendation for display to the viewing user.

* * * * *